United States Patent

[11] 3,544,735

[72] Inventors Edward Olszewski
Fair Haven;
Richard R. Plum, Middletown Township,
Monmouth County, New Jersey
[21] Appl. No. 783,250
[22] Filed Dec. 12, 1968
[45] Patented Dec. 1, 1970
[73] Assignee Bell Telephone Laboratories, Incorporated
Murray Hill, New Jersey
a corporation of New York

[54] AUTOMATIC OBSERVER SPEECH MONITORING CUT OFF AND RESTORAL EQUIPMENT
20 Claims, 3 Drawing Figs.

[52] U.S. Cl. .......... 179/175.2
[51] Int. Cl. .......... H04m 3/22
[50] Field of Search .......... 179/175.2(C)

No References Cited

*Primary Examiner*—William C. Cooper
*Attorney*—R. J. Guenther and James Warren Falk

ABSTRACT: A service observer telephone circuit is disclosed for controlling a speech transmission path and a path for transmitting control and supervisory signals from a call distributor through a position circuit toward an observer position. The telephone circuit is equipped for automatically disabling, or cutting off, a service observer's ability to monitor customer-to-customer conversations on the speech path during observed calls and for automatically restoring the monitoring ability upon changes in call supervision. A pair of timers control the speech cutoff and key controlled switching apparatus selectively recycles the timers to delay the automatic cutoff.

INVENTORS E. OLSZEWSKI
R.R. PLUM
BY
Frederick W. Padden
ATTORNEY

AUTOMATIC OBSERVER SPEECH MONITORING CUT OFF AND RESTORAL EQUIPMENT

BACKGROUND OF THE INVENTION

This invention relates to service observing equipment and particularly to equipment for ensuring the privacy of customer conversations during the observing of telephone call service furnished by a telephone switching system and operators.

Telephone companies expend considerable time, money and effort on the maintenance of their facilities and the training of their personnel so that heir customer service is of the highest practicable quality. However, despite such expenditures, calls are occasionally served in a manner less than satisfactory due to the malfunctioning of switching apparatus, the failure of components or mistakes by operators. In order that such occurrences are minimal, it is a customary practice for telephone companies to observe service on a small percentage of the calls placed through their facilities.

Service observing is utilized as a tool in localizing and identifying actual and potential problems which may impair service. The observations provide for the checking of customer requests and dialed instructions, the quality of operator assistance, as well as the control and supervisory functions of the switching machine. It is a standard operating procedure of telephone companies that all of such checking functions be performed with minimal monitoring by an observer of the customer-to-customer call conversations. The procedure militates against such monitoring in all cases other than, for example, a brief period of listening in to check that the correct called party has been connected on a call.

Typically, a service observation is conducted by connecting a call to an operator who monitors its progress and determines whether the switching equipment functions properly to complete the connection requested by the calling customer. On calls which require operator assistance, such as person-to-person, collect and coin calls, an observing operator also monitors the conversation between the customer and the assistance operator to determine whether this assistance is provided efficiently and courteously.

An observing operator normally remains on call connections only long enough to enable her to determine whether the connection desired by the caller is satisfactorily established. Once she makes this determination, the observer position is disconnected and made available for serving other calls. In certain systems and on a small percentage of all calls observed, an observing operator may r remain on the connection either until the end of the call or until the end of a predetermined interval. This is done in order that the observer may monitor the quality of any additional service subsequently provided, such as, the assistance provided by an observed operator when a customer flashes his switchhook during a call, the notification by an operator that a coin call is extending into an overtime period, and the statement and collection of charges for coin calls. Another reason for observing the duration of calls is to permit an observer to time each call and provide a cross-check on the charges derived for the same call by automatic charging facilities. In view of the foregoing, it is readily apparent that service observing is conducted to monitor supervisory and control functions of the telephone system and operators rather than the content of conversations between calling and called parties.

A need exists in present day service observing equipments for circuitry, which operates selectively on an automatic basis, to disconnect an observer position from the speech path of call connections to ensure the privacy of the caller and calling party conversations. It is further desirable that such privacy be afforded without impairing the monitoring and collection of data pertaining to control and supervisory functions of the telephone switching machine and operators.

SUMMARY OF THE INVENTION

In accordance with principles of our invention, service observing facilities are equipped with circuitry for automatically disconnecting observer telephone facilities from the speech or voice transmission path of telephone call connections during the time of calling and called party conversation. Our invention, while fulfilling the desire for the privacy of customer call conversations, provides apparatus for continual call monitoring of both the customer requests for assistance and the response thereto of the telephone system and operators.

A specific illustrative embodiment of our invention is furnished in an observer telephone circuit having switching apparatus which is operated under control of timer circuitry for automatically disabling the observer's conversation monitoring ability after a prescribed time interval following the receipt of a call at the observer position. The timed interval is sufficient for enabling the observer to obtain data as to the telephone system and operator performance on the initial customer needs for assistance in establishing call connections to a desired called party and then to verify an answer by the correct called party before the automatic disconnect.

The timed cutoff of voice transmission to an observer is illustrated in the exemplary embodiment for four different classes of calls which are typically observed in present day telephone systems. The classes of calls include, by way of example, calls dialed by customers, calls switched over trunks, calls served through cord operator positions, and special service calls served by traffic service position operators. Each of these classes of calls is individually switched on a one at a time basis through a call distributor and a position circuit to the observer telephone circuit.

Separate transmission paths are furnished through the telephone circuit to the observer position for the speech and the supervisory and control signals on each observed call. According to our invention, the speech transmission path is equipped with apparatus which is activated by control circuitry cooperating with timer arrangements for automatically cutting off and restoring speech transmission to an observer during an observed call.

The observer telephone circuit is furnished with apparatus for registering each of the four classes of calls receivable for service observation. A timer circuitry is activated in response to a class of call registration for selectively generating one of four different timing intervals. At the end of the generated timing interval, the speech path between the observed call connections and the observer position is automatically disabled or opened to cutoff the monitoring of speech thereon at the observer position during conversation between calling and called stations. It is a feature of this invention that the telephone circuit provides switching means which is selectively operative under key control at the observer position for effecting the opening of the speech path to cutoff observer speech monitoring ability prior to the expiration of the generated timing interval.

Another aspect of our invention is that service observing connections are established during called station digit transmission and that facilities are provided for automatically controlling the timer circuitry to initiate the generation of a predetermined one of the timing intervals following the digit transmission.

A further feature of this invention is that the timer circuitry includes two timers which are sequentially operable on predetermined classes of calls to generate successive timed intervals. Switching devices are also included in the observer telephone circuit for selectively delaying the opening of the speech path after th end of the first timing interval and until the completion of the second timing interval. At the end of the first timing interval a lamp indication is automatically given to alert the observer to the imminent automatic cutoff of speech monitoring on an observed call.

Recycling facilities are provided for enabling the observer to recycle the timers on prescribed classes of calls. The facilities include a switching arrangement which is operative under key control to allow a maximum of three successive timer recycles on a single observed call. On a specific class of call, the second timer operation is recycled and interrupted until a delayed call progresses toward the inception of customer-to-customer conversation. Such delays occasionally arise on operator-served calls such as person-to-person and coin calls.

Another salient aspect of our invention is that the observer speech monitoring ability is automatically restored after a cutoff and selectively in response to a customer service request or to the furnishing of operator assistance during the call. Such automatic restoral permits the observer to monitor assistance operator-customer conversation, for example, upon overtime notification and charging functions on coin calls. Speech monitoring is automatically restored in response to a change in call supervision such as is occasioned by customer switchhook flashing or to operator reconnection on a call following a customer service request or the entry of a call into an overtime period.

DRAWING DESCRIPTION

The foregoing and other objects, features and advantages of our invention will be more fully understood from a reading of the following description with reference to the drawing in which:

FIG. 1 is a block diagram showing a call distributor for switching four different classes of calls through a position circuit to an observer position via an observer telephone circuit which is equipped with timers and automatic cutoff and restoral control circuitry for a speech transmission path; and FIGS. 2 and 3 show in block and schematic form the structural details of the automatic cutoff and restoral control circuitry and two timers.

DETAILED DESCRIPTION

Figure 1:
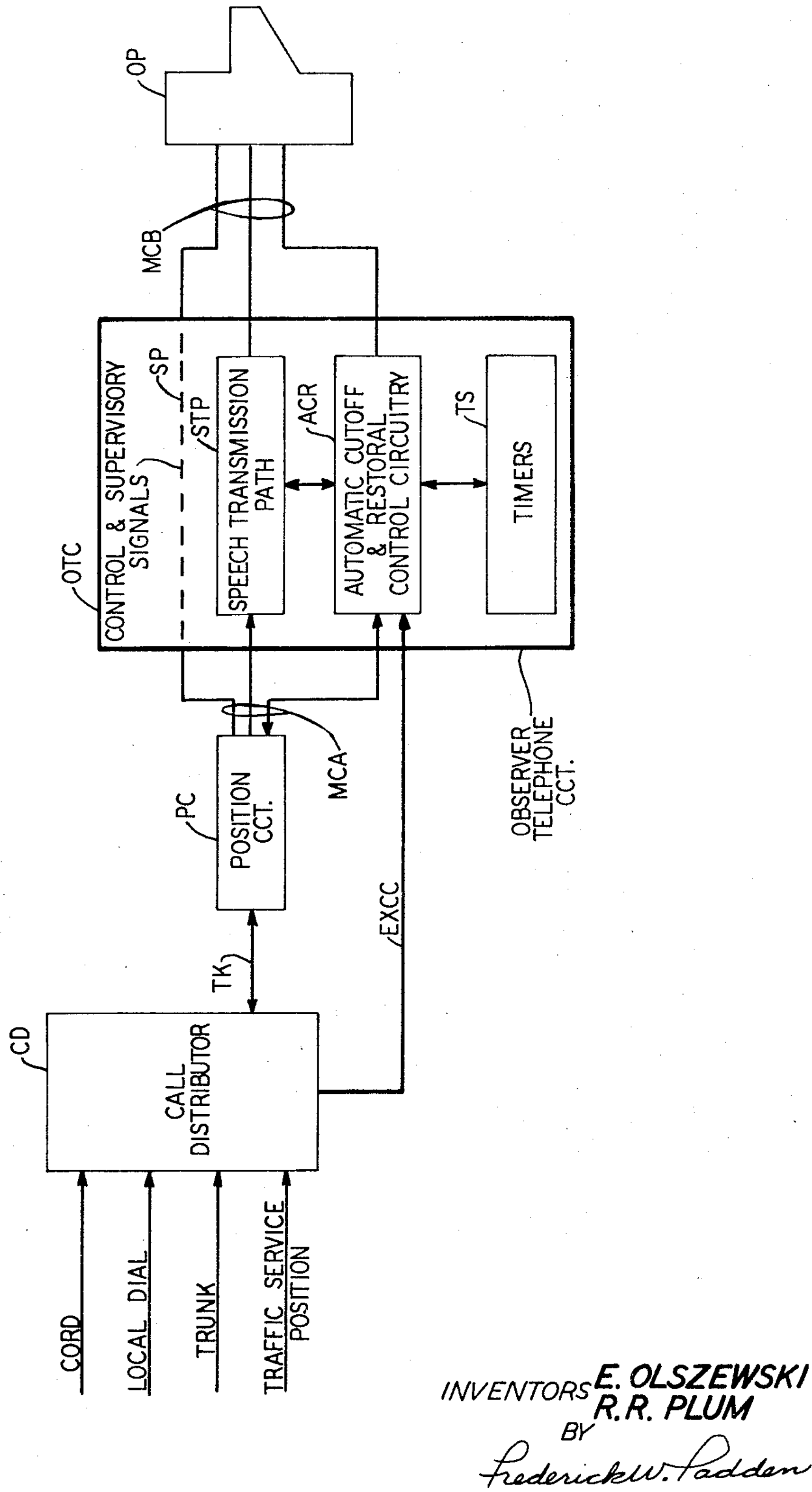

Referring to FIG. 1, a call distributor CD receives cord, local dial, trunk and traffic service position calls for service observation and switches each received call on a one at a time basis over a trunk TK through a position circuit PC, a multiconductor cable MCA, an operator telephone circuit OTC, a multiconductor cable MCB to an observer position OP. Telephone circuit OTC furnishes a speech transmission path STP from the position circuit PC to position OP for enabling an observer to monitor an assistance operator conversation with a calling party in order to determine the efficiency and courtesy of the operator assistance. Path STP also enables an observer to monitor called party responses upon answering a call to ensure that the desired called party is obtained by virtue of telephone system operations and operator assistance. The speech transmission path facilities are controlled by automatic cutoff and restoral control circuitry ACR which cooperates with timers TS to provide for the automatic cutoff and restoral of the speech monitoring ability of an observer. Control circuitry ACR is activated by position circuit PC upon the receipt of an observed call for initiating a timing sequence at the end of which the speech signal transmission to the observer is interrupted. The interruption occurs as the result of the timers TS operating the control circuitry ACR to open the speech transmission path STP. The timing sequence is selectively adjusted for each of the different observed classes of calls to enable the observer to perform her assigned tasks and importantly to provide for the exclusion of the observer from caller and called party conversation. Following an automatic cutoff of speech transmission, the position circuit PC detects changes in call supervision due, for example, to customer switchhook flashing, overtime periods on coin calls and call disconnects, and activates control circuitry ACR automatically to restore the speech transmission path for enabling an observer to monitor subsequent speech between an assistance operator and the customer. Control and supervisory signals generated during an observed call are transmitted over a conventional signaling path SP through the observer telephone circuit OTC to position OP for routine observation and analysis.

The observer position OP is equipped with facilities for operating the control circuitry ACR on a semiautomatic basis under control of the observer to delay the cutoff of the speech transmission to position OP. Semiautomatic delay of cut off is advantageous on calls involving delays in call completions, such as occur due to busy or effective circuits to call destinations, operator mistakes, and completion of calls to wrong call destinations due to dialing errors or other malfunctions. Apparatus is also provided in the control circuitry ACR for automatically canceling the cut off and restoral operations on specific observed calls under control of signals received from position circuit PC.

Figure 2:
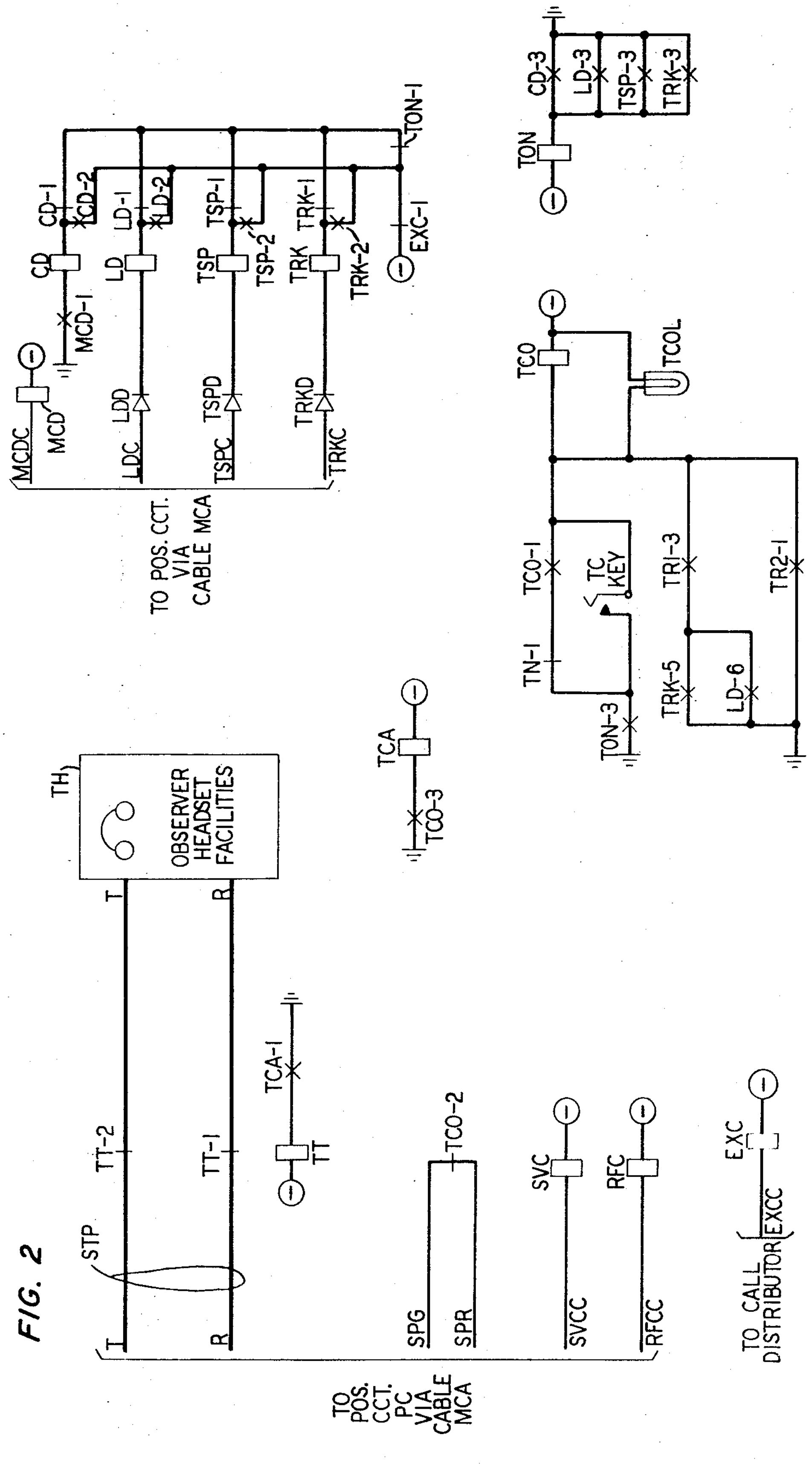

Turning now to FIG. 2, a description is presented of the detailed operations of the observer telephone circuit OTC in the automatic cutoff and restoral of the speech monitoring ability of an observer on various observed calls. The speech transmission path STP extending through circuit OTC between position circuit PC and the telephone headset facilities TH of position OP includes conductors T and R and contacts TT-1 and TT-2 of relay TT. The latter relay is selectively operated, as hereinafter explained, during an observed call to open, or disable, the speech transmission to an observer.

Observer telephone circuit OTC is equipped with four relays CD, LD, TSP and TRK of FIG. 2, each of which is operatively associated with the observed calls of the cord, local dial, traffic service position and trunk classes, respectively. Each of these relays registers an individual one of the four classes of calls and conditions the automatic cut off and restoral control circuitry and the timers for performing specific individual functions during the observation of the associated class of call. Position control PC is arranged to operate each of the relays CD, LD, TSP and TRK on a one at a time basis to signify the appropriate one of the classes of call to be observed. When position circuit PC is engaged on a call by call distributor CD, it applies a ground to the appropriate one of the conductors MCDC, LDC, TSPC or TRKC to signify the class of the observed call and to operate an associated register relay MCD, LD, TSP or TRK. Illustratively, relay TRK operates in a path from ground on conductor TRKC through diode TRKD, the TRK relay winding and contacts TRK-1, TON-1 and EXC-1 to negative potential. In operating, relay TRK closes its locking path via contacts TRK-2 and EXC-1. The operate paths for relays LD and TSP are similar to those of relay TRK. Relay MCD operates over the obvious path in response to a ground on conductor MCDC and, in turn, causes the operation of relay CD in a circuit from ground via contact MCD-1, the CD relay winding and contacts CD-1, TON-1 and EXC- 1 to negative potential. Upon operating, relay CD closes its locking path via contacts CD-2 and EXC-1.

The operation of any one of the relays CD, LD, TSP, or TRK in turn operates relay TON over the obvious path through contact CD-3, LD-3, TSP-3 or TRK-e to ground. In operating, relay TON ensures the operation of only one of the CD, LD, TSP and TRK relays at a time by opening contact TON-1.

An exclusion relay EXC of FIG. 2 is provided for disabling the operation of the timed automatic speech cutoff feature. Relay EXC is selectively operated in response to a ground signal applies to conductor EXCC at the position circuit PC. The operation of relay EXC opens the operate and locking paths for all of the relays CD, LD, TSP and TRK at contact EXC-1 thereby inhibiting speech cutoff.

Figure 3:
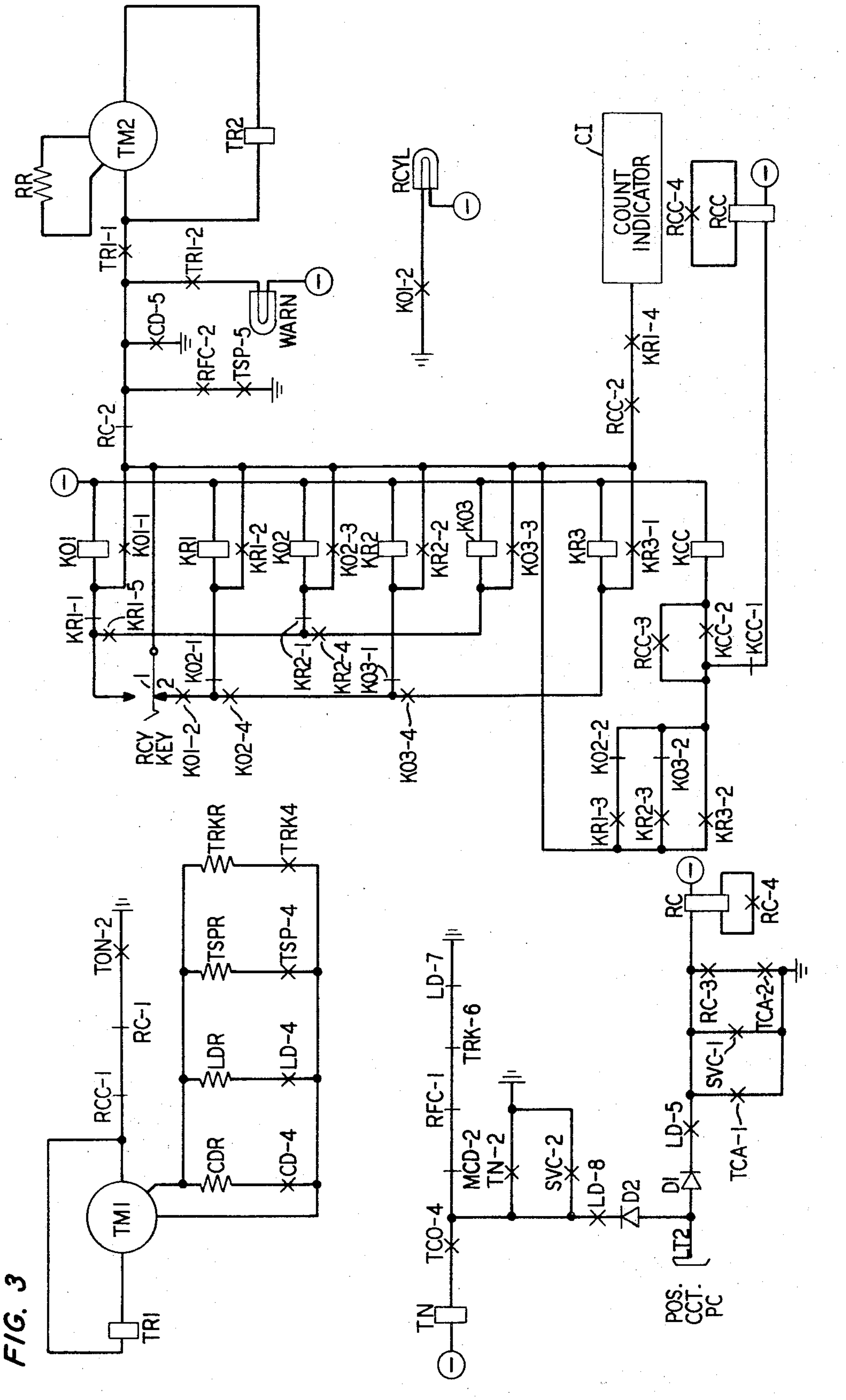

Timing for automatic speech cutoff if accomplished by two timers TM1 and TM2 of FIG. 3 with their associated relays TR1 and TR2. Timing by timer TM1 is initiated by the closure of the path via contacts TON-2, RC-1 and RCC-1 following the receipt of any one of the four classes of calls for observation and upon the operation of relay TON. The length of the timing interval generated by timer TM1 is dependent upon the class of call received by the telephone circuit for obervation. Timer TM1 is equipped with four resistors C, LDR TSPR and trkr which control the length of the timing intervals generated by timer TM1 for independent cutoff times on cord, local dial, traffic service position and trunk observations.

The latter resistors are individually connected in circuit with timer TM1 via contacts CD–4, LD–4, TSP–4, and TRK–4, but only one of the resistors is connected for a time controlling operation on each call. Relay TR1 is operated by timer TM1 at the end of a timing interval for controlling speech cutoff functions as later explained. Recycling of timer TM1 is controlled by contacts RCC–1 and RC–1 as hereinafter explained.

Timer TM2 is operative for service observing only on cord and traffic service position calls and generates a fixed timed interval as determined by resistor RR. Timing by timer TM2 is initiated on such classes of calls after the expiration of a timing interval by timer TM1. Specifically, timer TM2 timing is started upon the operation of relay TR1 which causes a ground to be applied to timer TM2 via contacts TR1–1 and CD–5 or RFC–2 and TSP–5. It is important to note that timing is initiated by timer TM2 on observed traffic service position calls only after relay RFC is operated to indicate that the observed position has placed to hold condition on the call or is released from the call in the process of completion to a called station. This procedure provides for complete observation of traffic service position functions and for a subsequent TM2 timer interval which is sufficient to enable the observer to monitor the called party response upon answering for ensuring that the correct station is reached before the automatic cutoff is effective.

When an operator or a traffic service position class of call is yet serving a call after the expiration of the TM1 timer interval, further timing by timer TM2 is interrupted due to relay RFC being released and opening contact RFC–2 in the TM2 timer circuit. The interruption persists until the operator releases from the call or places it on hold and thereby causes the operation of relay RFC. In the latter event, a time initiating ground is supplied via contacts TSP–5, RFC–2 and TR1–1 to timer TM2 to start the generation of its timing interval.

At the end of timing by timer TM1, a warning lamp WARN is illuminated to warn an observer that a timeout is imminent unless a recycle key RCY of FIG. 3 is momentarily actuated. Lamp WARN is energized over a path through contacts TR1–2 and CD–5 or RFC–2 and TSP–5 to ground.

According to the illustrative embodiment of our invention the timers TM1 and TM2 are selectively recycled under control of a recycle key RCY of FIG. 3 provided at the observer position. Switching apparatus including the relays RCC, KO1–KO3, KR1–KR3 and KCC of FIG. 3 cooperate with key RCY to repeat the timer recycling operations three successive times on a single call before the automatic cutoff of speech monitoring. Illustratively, the manual key recycling is effective only for observing calls through cord and traffic service positions during periods in which one or both of the timers TM1 and TM2 are timing. The manual recycle feature is effective on traffic service position observations provided that relay RFC of FIG. 2 is operated to indicate that the observed operator is in a hold, or locked loop, condition on a call or is released from a call in the process of completion to a called station. The recycle in the latter circumstance allows a limited amount of additional time for the observer to monitor the customer-to1customer conversation in order to check that a call is completed to the desired called station.

When recycle key RCY is first momentarily operated, it causes the operation of relay KO1 of FIG. 3 over a path from negative potential via the relay winding contact KR1–1, a make contact 1 of key RCY, and contacts RC–2 and CD–5 or RFC–2 and TSP–5. In operating, relay KO1 locks via its contact KO1–1 and energizes a recycle lamp RCYL via contact KO1–2 which thereafter remains illuminated until after the automatic cutoff of speech monitoring and the recycling of the timers under control of relay RC as later explained. Upon the release of key RCY, relay KR1 is operated via contacts KO2–1, KO1–2, contact 2 of key RCY, and contacts RC–2 and CD–5 or RFC–2 and TSP–5 to ground. Relay KR1 in operating locks via contact KR1–2 and effects the operation of recycle relay RCC of FIG. 3. The operate path for relay RCC is through its winding and contacts KCC–1, LO2–2, KR1–3, RC–2, and CD–5 or RFC–2 and TSP–5 to ground. Relay RCC in operating opens its contact RCC–1 to remove the timing initiating ground from timer TM - TO USE ITS RECYCLING AND THE RELEASE OF RELAY TR1 which, if operated, in turn opens its contact TR1–1 to recycle timer TM1. The operation of relay RCC activates a recycle count indicator CI via contacts KR1–4, RCC–2, RC–2 and CD–5 or RFC–2 and TSP–5. Relay RCC also effects the operation f relay KCC by closing its contact RCC–3. In operating relay KCC locks via its contact KCC–2 and opens its contact KCC–1 to effect the slow release of relay RCC under control of its upper winding being shunted by contact RCC–4. The release of relay RCC reinitiates timing operations by timer TM1 by reclosing ground via contacts TON–2, RC–1 and RCC–1. Upon releasing, relay RCC deenergizes the recycle count indicator CI BY OPENING CONTACT RCC–2.

A second subsequent momentary operation of key RCY causes the operation of relay KO2 of FIG. 3 over a path through contacts KR–2 and KR2–1, KR1–5, contact 1 of key RCY, and contacts RC–2 and CD–5or RFC–2 and TSP–5 to ground. In operating, relay KO2 locks via its contacts KO2–3 and opens at contact KO2–2 the locking path for relay KCC which then releases. When key RCY is released, relay KR2 is operated via contacts KO3–1, KO2–4 and KO1–2, contact 2 of key RCY, and the contacts RC–2 and CD–5 or RFC–2 and TSP–5 to ground. Relay KR2 in operating locks via contact KR2 –2 and effects the operation of relay RCC. The latter operation is over a path through the RCC relay winding and contacts KCC–1, KO3–2, KR2–3, RC–2 and CD–5 or RFC–2 and TSP–5 to ground. In operating, relay RCC opens its contact RCC–1 to remove the timing initiating ground from timer TMI to cause it to again recycle for effecting the release of relay TRI which, if operated, in turn opens its contact TRI–1 to recycle timer TM2. The operation of relay RCC again activates the recycle count indicator CI over the priorly traced path to indicate the accummulated number of recycles. Relay RCC is again operated upon the operation of relay RCC over a path through contacts RCC–3 KO3–2, KR2–3, RC–2 and CD–5 or RFC–2 and TSP–5. The operation of relay KCC effects the slow release of relay RCC by opening contact KCC–1. The release of relay RCC reinitiates timing operations by timer TMI by reclosing ground via contacts TON–2, RC–I and RCC–1. In addition, released relay RCC deactivates indicator CI.

A third recycle operation is initiated by a subsequent momentary operation of key RCY which causes the operation of relay KO3 of FIG. 3 over the path through contacts KR2–4, KR1–5, contact 1 of key RCY, Rc–2, and CD–5 or RFC–2 and TSP–5 to ground. Upon operating relay KO3 locks via contact KO3–3 and also causes the release of relay KCC by opening contact KO3–2. The release of key RCY causes relay KR3 to operate over a path from its winding through contacts KR3–4, KO2–4, KO1–2, contact 2 of key RCY, RC–2 and CD–5 or RFC–2 and TSP–5 to ground. Relay KR3 locks via contact KR3–1 and operates relay RCC over a path from its winding through contacts KCC–1, KR3–2, RC–2 and CD–5 or RFC–2 and TSP–5 to ground. The operation of relay RCC recycles timer TMI by opening contact RCC–1 for effecting the release of relay TRI and the recycling of timer TM2 as priorly explained. Count indicator CI is also incremented upon the operation of relay RCC and the reclosure of contact RCC–2. In operating, relay RCC operates relay KCC via contact KR3–2 and a priorly traced path. The operated relay KCC opens its contacts KCC–1 for causing the slow release of relay RCC which, in turn, reinitiates a final timing sequence before automatic cut off of the observer monitoring of customer-to-customer speech monitoring ability. When relay KCC operates, it locks operated via contacts KCC–2 and KR3–2 to prevent future recycling of timers TMI and TM2 until a subsequent supervisory change occurs during the customer call.

It is a salient feature of our invention that circuitry is furnished for recycling the timers TMI and TM2 on a fully automatic basis during observed calls. In the exemplary embodiment, automatic recycling is controlled by relay RC of FIG. 3. The operation of relay RC as later described opens its contacts RC–1 to recycle timer TMI and to effect the release of relay TRI for opening its contact TRI–1 to recycle timer TM2. Relay Rc is selectively operative under control of relay SVC of FIG. 2 which is, by way of example, operated by position circuit PC over the obvious path in response to a prescribed ground signal representing observed call supervisory changes such as customer switchhook flashes, and nonsupervisory changes such as automatic assistance operator callback during overtime intervals on coin calls served by traffic service position. The operation of relay SVC causes the operation of relay RC via contact SVC–1. In operating, relay RC closes its contact RC–4 across its secondary winding to prolong its subsequent release.

Relay RC is also operated automatically on observed local dial calls to recycle timers TMI and TM2 timers TM1 and TM2 while called station digits are being dialed or transmitted for example, for the completion of a call to a desired station. The latter operation occurs when position circuit PC applies a ground to lead LT2 to complete the operate path through diode DI- and contact LD–5 to the RC relay winding. As a result, after the completion of all dialing operations on a local dial class of call, the timers TM1 and TM2 actually commence timing for automatic cutoff of speech monitoring.

In addition, relay Rc is operated to recycle and disable the timers TM1 and TM2 after the actual timed cutoff of speech monitoring. The latter operation occurs upon the actuation of contact TCA—1. Thereafter, relay Rc locks via its contact RC—3 and TCA—2to ground.

The transmission of customer-to-customer conversation signals to the observer over conductors T and R of FIG. 2 is cutoff or disabled by the operation of relay TT over the obvious path through contact TCA–1 of relay TCA of FIG. 2. The latter relay operates via contact TCO–3 under control of relay TCO. On observed local dial and trunk classes of calls, relay TCO operates at the expiration of the timing interval generated by timer TMI and following the operation of relay TRI TR1. The relay TCO operate path is via contacts TR1–3 and TRK–5 or LD–6 to ground. For cord and traffic service position calls, relay TCO operates via contact TR2–1 at the expiration of timing by timer TM2 and upon the operation of relay TR2 thereby. Observer position OP also is equipped with a cutoff key TC of FIG. 2 for effecting the operation of relay TCO prior to the expiration of timing by timer TM1 or TM2. The TC key functions are advantageously usable during the recycling periods for manually cutting off observer monitoring ability after a verification is made that the desired called party has been switched onto a call. The latter TCO relay operation occurs via contacts of key TC and TON–3 to ground. I operating, relay TCO locks via contacts TCO–1, TN–1 and to ground. The operation of relay TCO also opens its contact TCO–2 across conductors SPG and SPR to inform the position circuit PC of the imminent cutoff of speech transmission to the observer position. Whenever relay TCO is operated, lamp TCOL is also energized for notifying the observer of the cutoff.

A typical sequence is now described of circuit actions for an automatic timed cutoff of observer ability to monitor customer-to-customer speech. In the illustrative embodiment of our invention the position circuit PC upon receipt of a call for observation operates the appropriate LD, TSP, TRK or MCD and CD class register relays of FIG. 2 corresponding to the received class of call. The operated class relay then locks and inserts one of the time controlling resistors CDR, LDR, TSPR, or TRKR in circuit with timer TMI for setting a predetermined interval utilized for automatic cutoff on the observed class of call. In addition, the operated relay CD, LD, TSP or TRK activates relay on TON which in turn actuates timer TMI to generate the predetermined time interval. It is advantageous to note that latter interval. It is advantageous to note that the latter interval on the local dial class of call is measured from the receipt of the last dialed digit and by way of example is an interval within the range of 30 to 90 seconds. On trunk, cord and TSP classes of observed calls, the timed interval selectively commences upon the receipt of an observed call and advantageously after the receipt of a called station answer signal by position circuit PC.

For the trunk class of call, the automatic timed cutoff is determined by timer TM1 (timer TM2 is not operative on local dial or trunk classes of calls) and illustratively is between 10 to 30 seconds. Timers TM1 and TM2 cooperate to determine the timing interval on the cord and TSP classes of calls. Illustratively, the timing intervals of timers TM1 and TM2 and 20 to 80 seconds and 10 seconds respectively on cord and traffic service position (TSP) classes of calls.

Following the expiration of its timing interval, timer TM1 operates relay TR1. On the local dial and trunk classes of calls, the operation of relay IRI immediately causes the successive operation of relays TCO, TCA and TT. The latter operation opens the tip and ring conductors T and R between position circuit PC and the observer telephone headset facilities TH at contacts TT–1 and TT–2 thereby automatically cutting off, or disabling observer ability to monitor customer-to-customer to conversation.

On traffic service position classes of calls, if by the time relay TRI is operated, the assistance operator has not placed a hold condition on the observed call or has not released from the call, relay RFC is in a released state to open contact RFC–2 for temporarily stopping further timing by timer TM2. On the other hand, timer TM2 continues timing after the operation of relay TR1 provided the TSP operator has placed the observed call on hold or has released it.

When timing is continued following the operation of relay TR1 on TSP observed calls as well as on cord calls, lamp WARN is illuminated to alert the observer that speech monitoring ability on the observed call is to be cut off automatically in 10 seconds unless a manual recycle operation is effected. Our exemplary embodiment is equipped, as previously described for three successive manual recyclings of the timers TM1 and TM2 on the cord and TSP observed calls. Each such recycle is counted by a count indicator CI and is indicated by the illumination of lamp RCYL.

It is advantageous to explain that a manual semiautomatic cutoff of speech transmission is also effective during any timing interval, particularly during a recycle interval when customer-to-customer conversation progresses and observer functions are completed. The semiautomatic cutoff is effected by the TC key controlled operation of relays TCO, TCA and TT.

An automatic restoral of observer monitoring of speech on an observed call is subsequently implemented upon the operation of relay TN under control of the actuation of relay SVC in response to a call supervisory signal change (such as on-hook to off-hook on a trunk circuit due to customer switchhook flashes and undesired ringing) or the release of relay RFC on a traffic service position call. On a local dial class of call, relay TN operates in a path from its winding through contacts TCO–4, LD–8 and diode D2 to a ground supplied to lead LT2 by position circuit PC. Relay TN operates via contacts TCO–4 and SVC–2 to ground in response to call supervision changes. For traffic service position calls, relay TN operates via contacts TCO–4, MCD–2, RFC–1, TRK–6, and LD–7 to ground. In operating, relay TN locks via contacts TCO–4 and TN–2. The operation of relay TN also effects the release of relay TCO by opening its locking path at contact TN–1 while its operate paths through contacts TR1–3 and TR2—1 are opened due to the prior recycling of timers TM1 and TM2 under control of relay TCA operating recycle relay RC. When relay TCO releases, it effects the release of relay TCA by opening contact TCO–3. In turn, released relay TCA releases relay TT to reclose its contacts TT–1 and TT–2 for thereby automatically restoring the ability of an observer to monitor the speech on the observed speech path such as that between an assistance operator and a service requesting customer. The observer is alerted to the restoral of speech monitoring by a spurt of tone supplied to the observer headset TH in a conventional manner (not shown).

It is to be understood that the hereinbefore described arrangements are illustrative of the application of principles of our invention. Illustratively, our teaching emcompasses the automatic cutoff of communications to an observer and such communications may include machine speech data transmission by means of teletypewriter, computers and the like. The inventive teaching is to provide for the privacy of customer communications which are not needed for checking the quality and reliability of service. In light of this teaching, numerous other arrangements may be devised by those skilled in the art without departing from the spirit and scope of the invention.

We claim:

1. In combination, means responsive to the receipt of a call for service observation for extending a speech path for said call to a service observer position, and means automatically activated during said call for disabling said path to cut off the observation of speech during conversation between calling and called stations.

2. The combination in accordance with claim 1 further comprising means automatically operative on said call for rendering said disabling means effective to disable said speech path only after a receipt of a called station answer signal.

3. The combination in accordance with claim 1 further comprising means automatically operative on said call for rendering said disabling means effective to disable said speech path after the transmission of called station digits.

4. The combination in accordance with claim 1 further comprising means subsequently responsive to the receipt of a prescribed signal during said call for controlling said disabling means automatically to enable said speech path for subsequent observation of speech thereon.

5. The combination in accordance with claim 1 further comprising means automatically responsive to the receipt of a predetermined signal on said call for selectively precluding the automatic activation of said disabling means to permit the observation of speech during conversation between calling and called stations.

6. The combination in accordance with claim 1 further comprising timing means responsive to the receipt of said call for generating a timing interval, and wherein said timing means activates said disabling means at the end of the generated interval for automatically disabling said path to cut off the observation of speech thereon.

7. The combination in accordance with claim 6 further comprising means operable for recycling said timing means, means responsive to the activation of said disabling means for operating said recycling means to recycle said timing means, means subsequently responsive to the receipt of a prescribed signal for controlling said disabling means automatically to enable said speech path for subsequent observation of speech thereon, and means operated by said controlling means to control the generation of another said timing interval by said timing means, and wherein said disabling means is automatically activated at the end of the latter generated timing interval to cut off the observation of speech during subsequent conversation between the calling and called stations.

8. The combination in accordance with claim 6 further comprising means responsive to the receipt of digit data transmitted on said call for automatically controlling said timing means to commence the generation of said timing interval after the receipt of said data.

9. The combination in accordance with claim 6 further comprising manually operable means for selectively activating said disabling means prior to the end of said generated timing interval for disabling said path to cut off the observation of speech thereon.

10. The combination in accordance with claim 6 further comprising means selectively operative during the generation of said timing interval for recycling said timing means to generate said timing interval anew and thereby delaying the activation of said disabling means and the automatic cutoff of the observation of speech on said path.

11. The combination in accordance with claim 10 further comprising means activated by said recycling means for selectively controlling the recycling of said timing means successively a predetermined plurality of times.

12. The combination in accordance with claim 6 wherein said timing means includes first and second timers for generating said timing interval, said first timer being responsive to the receipt of said call for generating a first timed period of said interval, said second timer being selectively operative under control of said first timer at the end of said first timed period for generating a second timed period of said interval, and said disabling means being selectively activated by said first and second timers at the end of said first and second timed periods for automatically disabling said path to cut off the observation of speech thereon.

13. The combination in accordance with claim 12 further comprising means activated by said first timer at the end of said first timed period to produce an indication for alerting an observer to an automatic cutoff of the observation of speech on said path.

14. An observer telephone circuit comprising means responsive to the receipt of any one of a plurality of different classes of calls for selectively providing a speech path and a path for conveying control and supervisory signals to an observer position for call observation, means for registering the class of each received call, a timer activated in response to a class registration by said registering means for generating a predetermined one of a plurality of timing intervals, and means included in said speech path and selectively operated by said timer at the end of the generated one of said timing intervals for disabling said speech path to cut off the monitoring of speech thereon at the observer position during conversation between calling and called stations.

15. An observer telephone circuit in accordance with claim 14 further comprising means selectively operative under key control at said observer position for operating said disabling means to disable said speech path to cut off observer speech monitoring prior to the expiration of any of the generated timing intervals.

16. An observer telephone circuit in accordance with claim 14 further comprising means operated by said registering means on a prescribed registered one of said classes of calls and during the transmission of called station digits therefor for automatically controlling said timer to initiate the generation of one of said timing intervals following the transmission of said digits.

17. An observer telephone circuit in accordance with claim 16 further comprising means activated by said timer and said registering means on another registered one of said classes of calls at the end of said generated timing interval for generating another timing interval, and wherein said disabling means is selectively activated under control of said registering means to delay the disabling of said speech path to cut off the monitoring of speech thereon until the end of said other timing interval.

18. In equipment providing a speech path for enabling an observer to observe call service between calling and called stations, the invention comprising means for automatically disabling said speech path during the call to cut off the observation of speech by an observer during conversation between said stations, and means automatically operative subsequently during said call for controlling said speech path to restore the speech monitoring thereon by said observer.

19. In equipment according to claim 18, the invention wherein said controlling means is automatically operative in response to a supervisory signal during said call to control said disabling means to enable said speech path and thereby restore the speech monitoring thereon by said observer.

20. In equipment according to claim 18, the invention wherein the observation is made of an operator position serving said call between the calling and called stations, and wherein said controlling means is automatically effective to control said disabling means to enable said speech path for speech observation during periods of an observed call when said position is engaged in furnishing call assistance.